(12) United States Patent
Mathew et al.

(10) Patent No.: US 10,832,435 B1
(45) Date of Patent: Nov. 10, 2020

(54) DETERMINING PAYLOAD CARRIER VOLUME USING A NEURAL NETWORK

(71) Applicant: Caterpillar Inc., Deerfield, IL (US)

(72) Inventors: Shawn Nainan Mathew, Savoy, IL (US); Christopher Ha, Champaign, IL (US); Yang Liu, Champaign, IL (US); Sanghyun Shin, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/396,238

(22) Filed: Apr. 26, 2019

(51) Int. Cl.
| | |
|---|---|
| *G06T 7/62* | (2017.01) |
| *B60P 1/02* | (2006.01) |
| *B60R 1/00* | (2006.01) |
| *G06K 9/62* | (2006.01) |

(52) U.S. Cl.
CPC ............ *G06T 7/62* (2017.01); *B60P 1/02* (2013.01); *B60R 1/002* (2013.01); *G06K 9/6215* (2013.01); *B60R 2300/30* (2013.01); *B60R 2300/802* (2013.01); *G06T 2207/20084* (2013.01)

(58) Field of Classification Search
CPC . G06T 7/62; G06T 2207/20084; B60R 1/002; B60R 2300/802; B60R 2300/30; B60P 1/02; G06K 9/6215
See application file for complete search history.

(56) References Cited

U.S. PATENT DOCUMENTS

| | | | |
|---|---|---|---|
| 8,472,699 B2 | 6/2013 | Ng et al. | |
| 9,637,887 B2 | 5/2017 | Wighton | |
| 2016/0289927 A1* | 10/2016 | Wang | E02F 3/651 |
| 2018/0120098 A1 | 5/2018 | Matsuo et al. | |
| 2018/0174291 A1 | 6/2018 | Asada et al. | |
| 2018/0245317 A1 | 8/2018 | Ready-Campbell et al. | |
| 2018/0268256 A1 | 9/2018 | Di Febbo et al. | |
| 2019/0026531 A1* | 1/2019 | Alvarez Gonzalez | |
| | | | G06T 17/05 |

FOREIGN PATENT DOCUMENTS

| | | |
|---|---|---|
| CN | 106408605 A | 2/2017 |
| CN | 107886136 A | 4/2018 |
| CN | 109035310 A | 12/2018 |

OTHER PUBLICATIONS

Perez, et al., "Deep Learning for Effective Detection of Excavated Soil Related to Illegal Tunnel Activities", Oct. 19, 2017, IEEE, pp. 626-632.

* cited by examiner

*Primary Examiner* — Tat C Chio
(74) *Attorney, Agent, or Firm* — Lee & Hayes, PLLC

(57) ABSTRACT

A method for loading a payload carrier of a machine includes receiving, from a camera on the machine, a two-dimensional image of an interior of the payload carrier as material is loaded into the payload carrier. The method further includes sectioning the two-dimensional image into a plurality of regions, and determining, for individual of the regions, whether the region includes a representative of fill material. The method may also include determining a fill volume based on the regions having fill and those not having fill.

20 Claims, 8 Drawing Sheets

DETERMINING PAYLOAD CARRIER VOLUME USING A NEURAL NETWORK

TECHNICAL FIELD

The present disclosure is directed to machine production optimization, and more particularly, to production optimization for operation of excavating machines such as a wheel tractor scraper.

BACKGROUND

Earthmoving machines may be used to move earth, rocks, and other material at an excavation site. Often, it may be desirable to move excavated material from an excavation site to another location remote from the excavation site. For example, the material may be loaded onto an off-highway haulage unit for transport to a dump site. As another example, the material may be excavated by a pull pan drawn behind a tractor, and then hauled, via the pull pan, to the dump site. As a further example, a wheel tractor scraper may be used for excavating, hauling, and dumping the excavated material.

In more detail, a wheel tractor scraper may be used in an operating cycle to cut material from one location during a load phase, transport the cut material to another location during a haul phase, unload the cut material during a dump phase, and return to an excavation site during a return phase to repeat the operating cycle. The decision to use a wheel tractor scraper, as opposed to some other excavating machine or system, may be based on factors such as the operating cost and the productivity of the machine or system.

The productivity and the cost of operating a machine, or a fleet of machines, may be adversely affected by certain factors. For example, an operator of a wheel tractor scraper may reduce efficiency by spending too much time in a load cycle relative to the time required to complete a haul cycle. Also, utilizing a particularly long load cycle to fully load or perhaps overload a machine may be efficient in terms of real productivity and cost for certain haul cycles, but for other haul cycles may deteriorate productivity and increase cost by increasing tire slip (increased tire wear), burning more fuel, increasing wear on ground engaging tools, and increasing wear on machine structure and powertrain components, for example.

Systems have been designed with a view toward increasing the efficiency of earthmoving machines, including during the loading phase. For example, U.S. Patent Application Publication No. 2016/0289927 to Wang et al. ("the '927 Publication") describes a bowl-monitoring system with a perception sensor that provides a signal to a controller that is indicative of a view of the bowl of the machine. Based on the signal, the controller determines a level of material in the bowl and provides an indication to an operator of the machine of the current loading status of the bowl.

While the system described in the '927 Publication helps increase loading efficiency, the system employs three-dimensional perception sensors such as LiDAR (Light Detection and Ranging) or a stereo camera to monitor the bowl. These types of perception sensors can be expensive, potentially making it cost-prohibitive to install on a fleet of machines. Additionally, three-dimensional image processing may be computationally expensive, requiring increased computing power further increasing the cost of the '927 Publication's.

The present disclosure is directed to one or more improvements in the existing technology.

SUMMARY

One aspect of the disclosure is directed to a method of determining a level of fill material in a payload carrier of a machine. The method may include receiving, from a camera on the machine, a two-dimensional image of an interior of the payload carrier. The method may include identifying a plurality of regions of the two-dimensional image corresponding to regions of the interior of the payload carrier. The method may include determining, for individual of the plurality of regions, that the two-dimensional image includes a representation of fill material. The method may also include determining a fill volume of the payload carrier based at least in part on the representations of fill material in the individual of the plurality of regions.

Another aspect of the disclosure is directed to a machine. The machine may include a payload carrier defining an interior having a volume, a camera configured to capture images of the interior of the payload carrier, a display device, and a controller. The controller may be configured to receive an image of the images; identify a plurality of regions of the image; determine, for individual regions of the plurality of regions, whether the image includes a representation of fill material; determine, based at least in part on whether the image includes the representation of fill material in the individual regions, a fill volume of the payload carrier; and cause the display device to display information about the fill volume.

Another aspect of this disclosure is directed to a camera system for assisting loading of a payload carrier of a machine. The camera system may include a camera, one or more processors, and memory storing instructions that, when executed by the one or more processors, cause the camera system to perform actions. The actions may include receiving, from the camera, an image of an interior of the payload carrier of the machine. The actions may include identifying a plurality of regions of the image. The actions may include determining, for individual regions of the plurality of regions, a presence of fill material in the image. The actions may also include determining, based at least in part on the presence of fill material in the image for the individual regions, a fill volume of the payload carrier.

DETAILED DESCRIPTION

Figure 1:
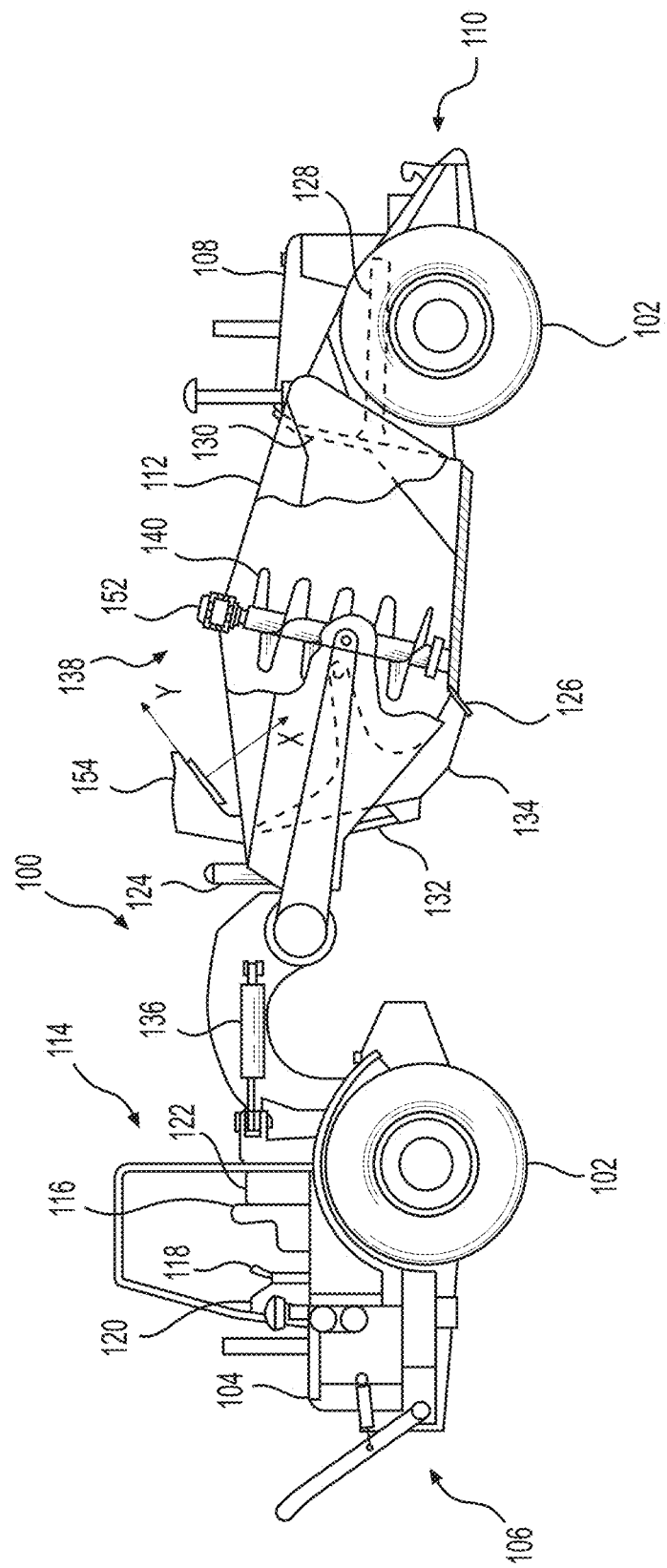
FIG. 1 is an illustration of a machine according to an exemplary disclosed embodiment.

FIG. 1 diagrammatically illustrates a machine 100 which may be, for example, a wheel tractor scraper. The machine 100 may be any machine for performing work on a site using a ground-engaging tool. The machine 100 may include various components or sub-machines such as wheel tractor scrapers, pull-pans, etc.

The machine 100 may include one or more traction devices 102, such as front and rear wheels, tracks, or the like, enabling the machine 100 to function as a mobile unit. A suitable power source 104, e.g., a diesel combustion engine, may be located at a front 106 of the machine 100. An additional power source 108, which also may be a diesel engine, may be included at a rear 110 of the machine 100.

A payload carrier 112 between the front 106 and the rear 110 of the machine 100 may enable the machine 100 to transport a quantity of material or fill, such as earth (soil, rock, etc.). On a wheel tractor scraper, the payload carrier 112 may be a container to receive and hold fill for transport and may sometimes be called a scoop or bowl.

The machine 100 may further include an operator station 114. The operator station 114 may include an enclosed or partially-enclosed cab, and may include an operator seat 116, suitable operator control devices 118, a display device 120, and/or other components for operating the machine 100.

The machine 100 also may include a suitable control system, including a controller 122, various detectors or sensors, and various actuators for operating the components of the machine 100. For example, the machine 100 may include one or more actuators 124, such as hydraulic cylinders, for raising and lowering the payload carrier 112. The actuators 124 may lower payload carrier 112 so that a ground engaging tool 126, typically located at the lower front edge of the payload carrier 112, may penetrate material to be loaded during a load phase of the machine 100. The actuators 124 may also raise the payload carrier 112 for transportation of the payload during a haul phase of the machine 100. Additional actuators may include one or more actuators 128 to move an ejector 130 during a dump phase and one or more actuators 132 for controlling an apron 134.

In more detail, the actuators 132 may move the apron 134 from engagement with the front portion of the payload carrier 112 to an open position during load and dump phases. The actuators 132, e.g., by reverse movement, may also maintain the apron 134 in a closed position engaged with the front portion of the payload carrier 112 during a haul phase. The apron 134 may operate synchronously with the ejector 130 during a dump phase. For example, the actuators 132 may move the apron 134 to the open position and the actuators 128 may move the ejector 130 within the payload carrier 112 to assist in dumping the payload.

Steering of the machine 100 may be facilitated by a steering unit including one or more actuators 136 located, for example, at a position between the payload carrier 112 and the front 106 of the machine 100.

As illustrated in FIG. 1, in some embodiments, a load assist unit 138 may optionally be associated with the payload carrier 112. The exemplary load assist unit 138 shown in FIG. 1 is representative of various types of load assist units that may be employed, including, for example, auger units or elevator units. In FIG. 1, the load assist unit 138 is illustrated as an auger 140. It will be understood that the load assist unit 138 may include a plurality of augers, an elevator unit, or other expedients which may assist the loading of material into the payload carrier 112. The load assist unit 138 may be driven by a suitable machine actuator, e.g., a rotary hydraulic actuator 152.

The machine 100 may include other components to assist the operator in loading and dumping payload carrier 112 and/or to control the machine 100 autonomously to do so. In the disclosed embodiments, a camera 154 may be positioned to view the interior of the payload carrier 112 to enable determination of the amount of material accumulated in the payload carrier 112. For example, the camera 154 may be mounted on a portion of the payload carrier 112, for example on a mast or stalk, to yield a view of the fill material entering the payload carrier 112 and accumulated therein. In one embodiment, the camera 154 may be a two-dimensional camera such as a category B (bridge digital) camera.

Machines to which this disclosure applies, for example, wheel tractor scrapers, may operate in cycles that can include load, haul, dump, and return phases. In a given earth- or material-moving operation, such as that carried out by a wheel tractor scraper, machine cycles of operation may be affected by various parameters and/or factors which may be referred to as cycle characteristics. Consideration of cycle characteristics during machine operation may enable enhancement, optimization, and/or maximization of machine productivity, along with control of operation costs, through optimization of machine payload.

Cycle characteristics may include, for example, the length of the haul phase of a cycle, the grade to be negotiated by the machine, the character of the ground over which the machine must travel, the character of the machine (e.g., the machine size and manner of loading), the type of material loaded, machine speed relative to the amount of payload, or the like. Another cycle characteristic that may be considered in connection with a wheel tractor scraper is a load growth curve. A load growth curve is a graphic representation of the increase in payload volume during machine loading. For a wheel tractor scraper, the load growth curve normally may indicate that most of the payload volume is loaded early during the load phase of an operating cycle, with a gradually diminishing increase in payload later in the load phase. For example, fill may fall out of the payload carrier 112 as the fill level increases and/or fill entering from the bottom of the payload carrier 112 may experience more resistance from fill already in the payload carrier 112.

Figure 2:
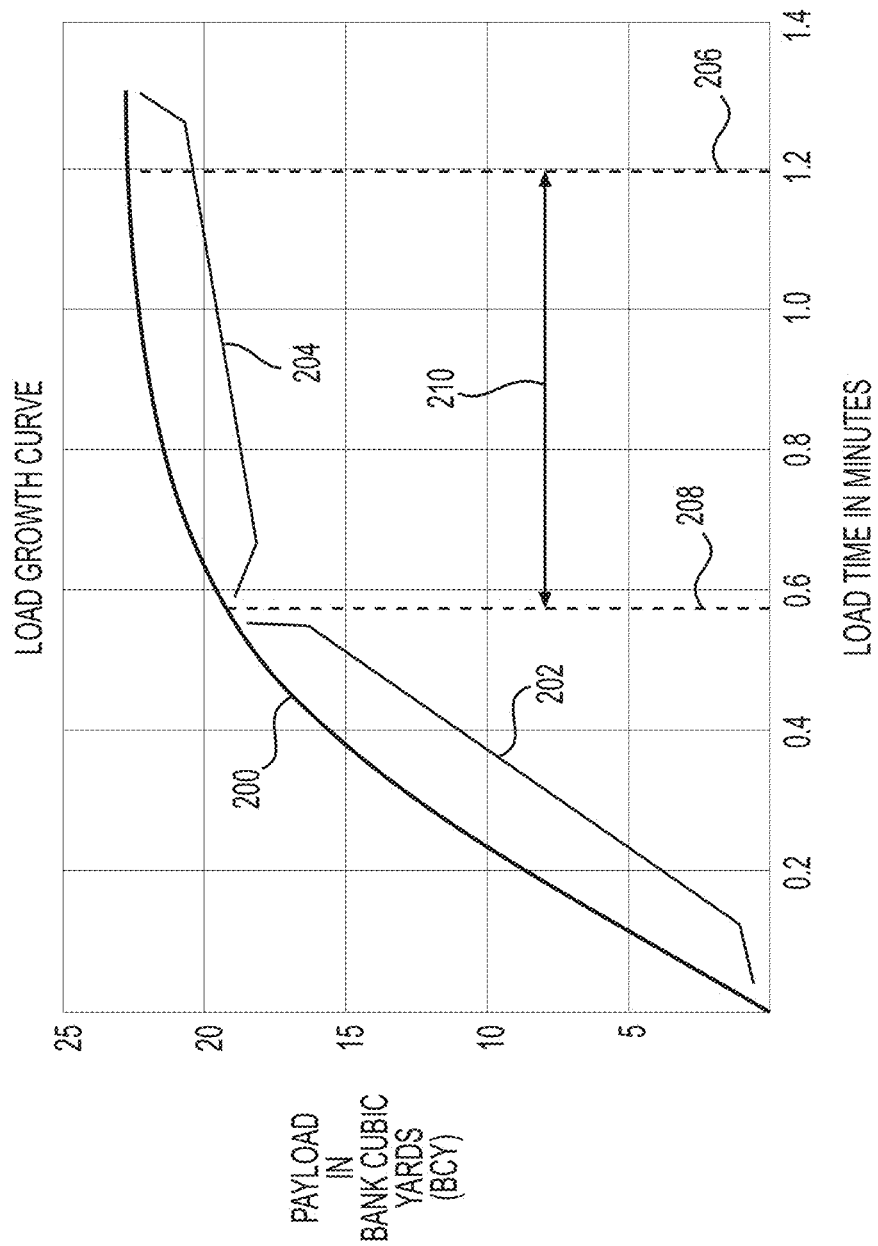
FIG. 2 is a graph of a load growth curve for the machine of FIG. 1, according to aspects of this disclosure.

FIG. 2 graphically illustrates an exemplary load growth curve 200 for a machine, such as the machine 100, which may be a wheel tractor scraper. Payload is represented on the y-axis, and generally may be measured in bank cubic yards (BCY) or bank cubic meters (BCM). Load time may be measured on the x-axis, with the unit of time in minutes and/or fractions thereof, for example.

As illustrated, the load growth curve 200 may exhibit a rather steep portion 202 during initial stages of loading and may level off, exhibiting a less steep portion 204, as the load phase proceeds. Thus, the bulk of payload volume may be accumulated in the part of the load phase corresponding to the steep portion 202, with subsequent increase in payload gradually diminishing, corresponding to the less steep portion 204. This characteristic shape for a load growth curve may be attributed to the fact that, as the payload carrier 112 receives more and more material, later loaded material may be required to lift or force its way through previously loaded material.

As shown in FIG. 2, the load growth curve 200 reflects an actual stop time 206 and an optimum stop time 208. The actual stop time 206—about 1.2 minutes in this example—may correspond to the time at which an operator in practice typically stops loading the payload carrier 112 with fill. For example, in conventional usage, the operator may watch the payload carrier 112 as it fills up and, based on the operator's observation of fullness, control the machine 100 to stop filling the payload carrier 112. In contrast, the optimum stop time 208—0.6 minutes in this case—may correspond to an optimum time at which loading may stop to maintain efficient and effective machine operation. The optimum stop time 208 may correspond to a point on the load growth curve 200 at which the steep portion 202 more sharply transitions to the less steep portion 204. As noted above, in the FIG. 2 example, the optimum stop time 208 is about 0.6 minutes. Thus, in this example, an operator may typically continue loading for about 0.6 minutes after the optimum stop time 208—half of the total loading time. While the payload carrier 112 accumulated about 18 BCY of fill in the first 0.6 minutes of loading, it only accumulated an additional 3 BCY of fill during the additional loading time 210 of 0.6 minutes, e.g., the time from the optimum stop time 208 to the actual stop time 206. The additional loading time 210 is an inefficient use of resources, including fuel and time.

It will be appreciated that machines like wheel tractor scrapers may have differing load growth curves, depending, for example, on the size of the machine, whether the machine is self-loading, whether the machine is push loaded, whether the machine is of the push-pull type, whether the machine has an expedient to augment loading (e.g., an elevator or auger), the type of material or fill loaded (e.g., clay, sand, gravel, mixture of rock and earth, etc.), and/or the size and shape of the payload carrier 112. The load growth curve for a given machine operating under a given set of circumstances may be determined empirically, in advance of actual production operation of the given machine. This may be accomplished by test operation and previous field experience, for example.

The controller 122 may include a central processing unit, a suitable memory component, various input/output peripherals, and other components typically associated with machine controllers. The controller 122 may include programs, algorithms, data maps, etc., associated with operation of the machine 100. The controller 122 may be configured to receive information from multiple sources, such as, for example, one or more of the actuators 124, 128, 132, and 136, the camera 154, various sensors or detectors (e.g., for machine travel direction, ground speed, engine operation, etc.), as well as input from a machine operator via, for example, the control devices 118. The controller 122 may be suitably located to send and receive appropriate signals to and from the various sensors, actuators, etc., associated with the machine 100. In one embodiment, as shown in FIG. 1, the controller 122 may conveniently be located within or adjacent the operator station 114. For example, the controller 122 may comprise a laptop or mobile computer of the operator. Alternatively, the controller 122 may comprise a dedicated electronic control module (ECM) or other type of onboard computer of the machine 100. In some embodiments, aspects of the controller 122 may be incorporated into the camera 154 such that the camera 154 is a "smart camera" configured to perform the disclosed operations of the controller 122. In this case, the controller 122, or certain aspects thereof, may be eliminated.

Figure 3:
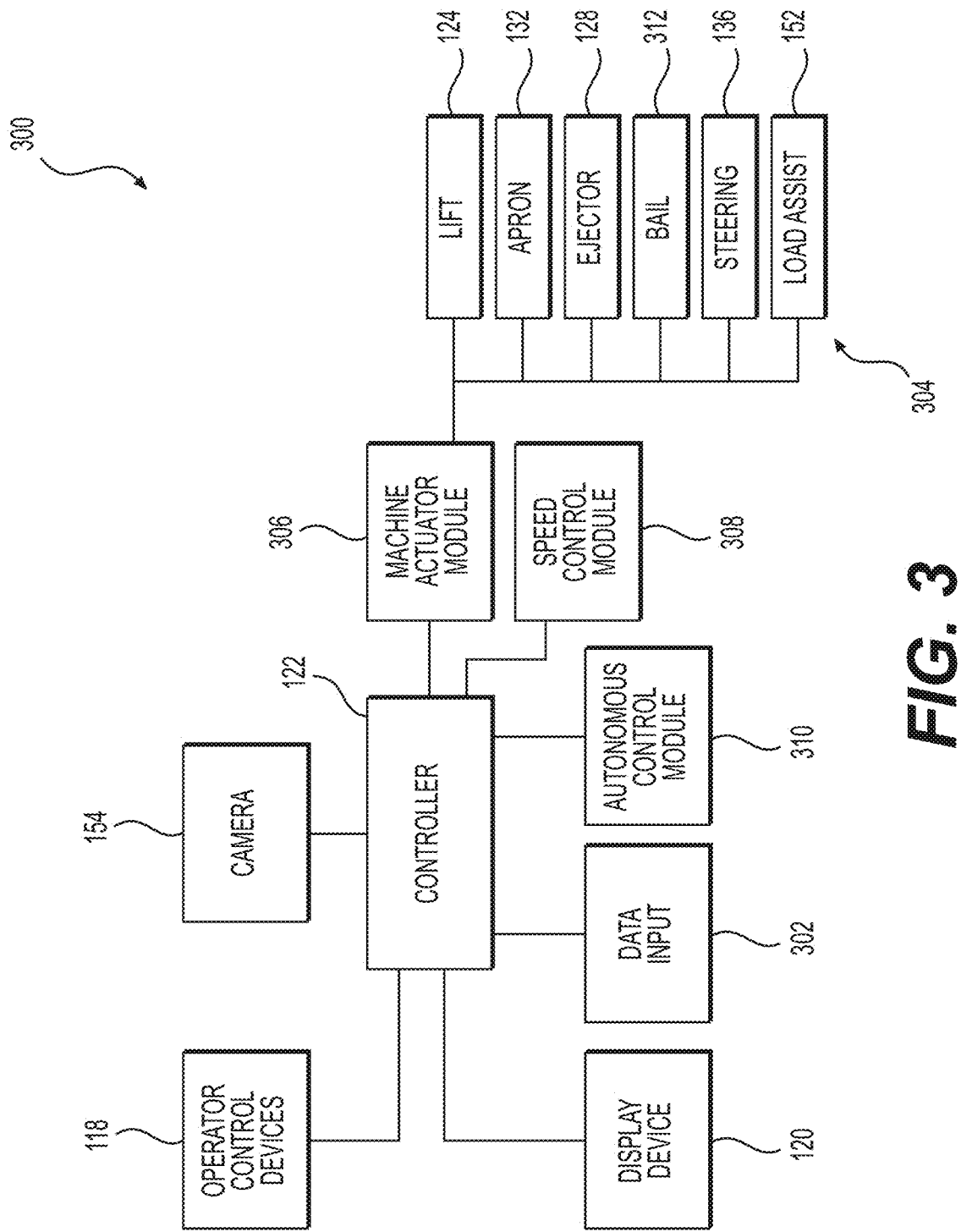
FIG. 3 is a schematic illustration of an exemplary control system of the machine of FIG. 1, according to aspects of this disclosure.

FIG. 3 schematically shows an exemplary control system 300, which may be associated with the controller 122. The controller 122 may suitably communicate with various machine components, for example via conductors. The operator control devices 118 and the display device 120 may enable an operator to manually supply signals to the controller 122. The display device 120 may, for example, provide an operator with various information to enhance operator awareness of various machine systems and thereby facilitate maintaining effective and efficient machine operation. The controller 122 may receive data input 302 from various sources, including keyboards, a touch screen display (which, for example, may be associated with the display device 120), computer storage devices, Internet repositories, wireless networks, or other sources of data input known to those skilled in the art.

In the control system 300, the controller 122 also may communicate with various machine actuators 304 via a machine actuator module 306. The machine actuator module 306 may be configured to operate, for example, one or more of the lift actuator(s) 124, the apron actuator(s) 132, the ejector actuators(s) 128, a bail actuator 312, the steering actuator(s) 136, the load assist actuator(s) 152, or any other actuators associated with the machine 100.

In the control system 300, the controller 122 may further be configured to communicate with a speed control module 308 to control a mobile speed of the machine 100. The speed control module 306 may include, for example, engine speed control expedients, throttle control, transmission gear shifting control, etc.

As also illustrated in FIG. 3, the controller 122 may further be configured to communicate with an autonomous control module 310. The autonomous control module 310 may control the machine 100 to perform various tasks without any operator input, or with only a certain, e.g., limited, amount of operator input. For example, the autonomous control module 310 may be configured to operate the machine 100 in a loading mode for performing a loading phase at a certain loading location; a hauling mode for performing a hauling phase of hauling the loaded material from the loading location to a certain dumping location; a dumping mode for performing a dumping phase of dumping the material at the dumping location; and/or a return mode for returning the machine 100 to the loading location. In response to signals from the controller 122, the autonomous control module 310 may control the machine 100 to perform cycles of the loading, hauling, dumping, and return phases.

In some examples, the controller 122 may receive input data relevant to cycle characteristics, for example, on an on-going basis. This may enable relatively continual updating of calculated optimum payloads for the machine 100. For example, consistent with the disclosed embodiments, the controller 122 may receive data from the camera 154. In some implementations, the controller 122 may employ other components (not shown), such as an odometer, inclinometer, wheel slip sensors, another payload sensor (e.g., a scale), and/or various other sensors, detectors, diagnostic devices, etc. The controller 122 may use the data received from these components to gather data relevant to cycle characteristics and control the operations of the machine 100.

Consistent with the disclosed embodiments, the controller 122 may be configured to receive data from the camera 154 indicating whether the payload carrier 112 has been optimally filled with material in accordance with the load growth curve 200. In some instances, the controller 122 may be configured to determine, from image data received from the camera 154, the data indicating that the payload carrier 112 has been optimally filled. That is, in some implementations, the camera 154 may include functionality described herein to determine that the payload carrier 112 is optimally filled, although in other implementations, the controller 122 or some other processing device may include such functionality. Moreover, in still further examples, the functionality may be distributed across multiple devices, e.g., the controller 122 and the camera 154. Regardless of the source of the data, in response to this data, the controller 122 may be configured to provide signals to one or more components of the machine 100, such as the operator control devices 118, the display device 120, the machine actuator module 306, the speed control module 308, the autonomous control module 310, or the like. For example, in response to receiving a signal from the camera 154 indicating that the payload carrier 112 is optimally filled, the controller 122 may provide signal(s) to the operator control devices 118. Such signals may include a signal to change a loading indicator light in the operator station 114 from green (continue loading) to red (stop loading) to indicate to the operator that the payload carrier 112 is optimally filled. Alternatively, or additionally, the controller 122 may be configured to provide signal(s) to the display device 120 indicating that the payload carrier 112 is optimally filled. The display device 120, in turn, may provide a visual indication on the display letting the operator know that the payload carrier 112 is optimally filled. In additional examples, alternatively, or additionally, the controller 122 may be configured to provide signal(s) to the machine actuator module 306 indicating that the payload carrier 112 is optimally filled. The machine actuator module 306, in turn, may provide signals to actuate one or more actuators. For example, the machine actuator module 306 may provide one or more signals to: (1) the lift actuator 124 to raise the payload carrier 112; (2) the apron actuator 132 to move the apron 134 from an open position to a closed position engaged with the front portion of the payload carrier 112; (3) the ejector actuator 128 to move the ejector 130 within the payload carrier 112, such as to dump the payload or stow the ejector 130 for the hauling phase; (4) the bail actuator 312 to manipulate a bail at the front 106 of the machine 100; (5) the steering actuator 136 to change the angle between the front 106 and rear 110 sections of the machine 100; and/or (6) the load assist actuator 152 to stow a load assist unit for the haul phase.

Alternatively, or additionally, the controller 122 may be configured to provide signal(s) to the speed control module 308 indicating that the payload carrier 112 is optimally filled. In response to the signal(s), the speed control module 308 may be configured to reduce the speed of the machine 100 or stop the machine 100, to reduce throttle or the speed of the power source(s) 104, 108, etc. Also in examples, alternatively, or additionally, the controller 122 may be configured to provide signal(s) to the autonomous control module 310 indicating that the payload carrier 112 is optimally filled. In response to the signal(s), the autonomous control module 310 may, for example, change the current operating mode of the machine 100 from the loading mode to the haul mode or perform other functions to complete the loading phase.

Figure 4:
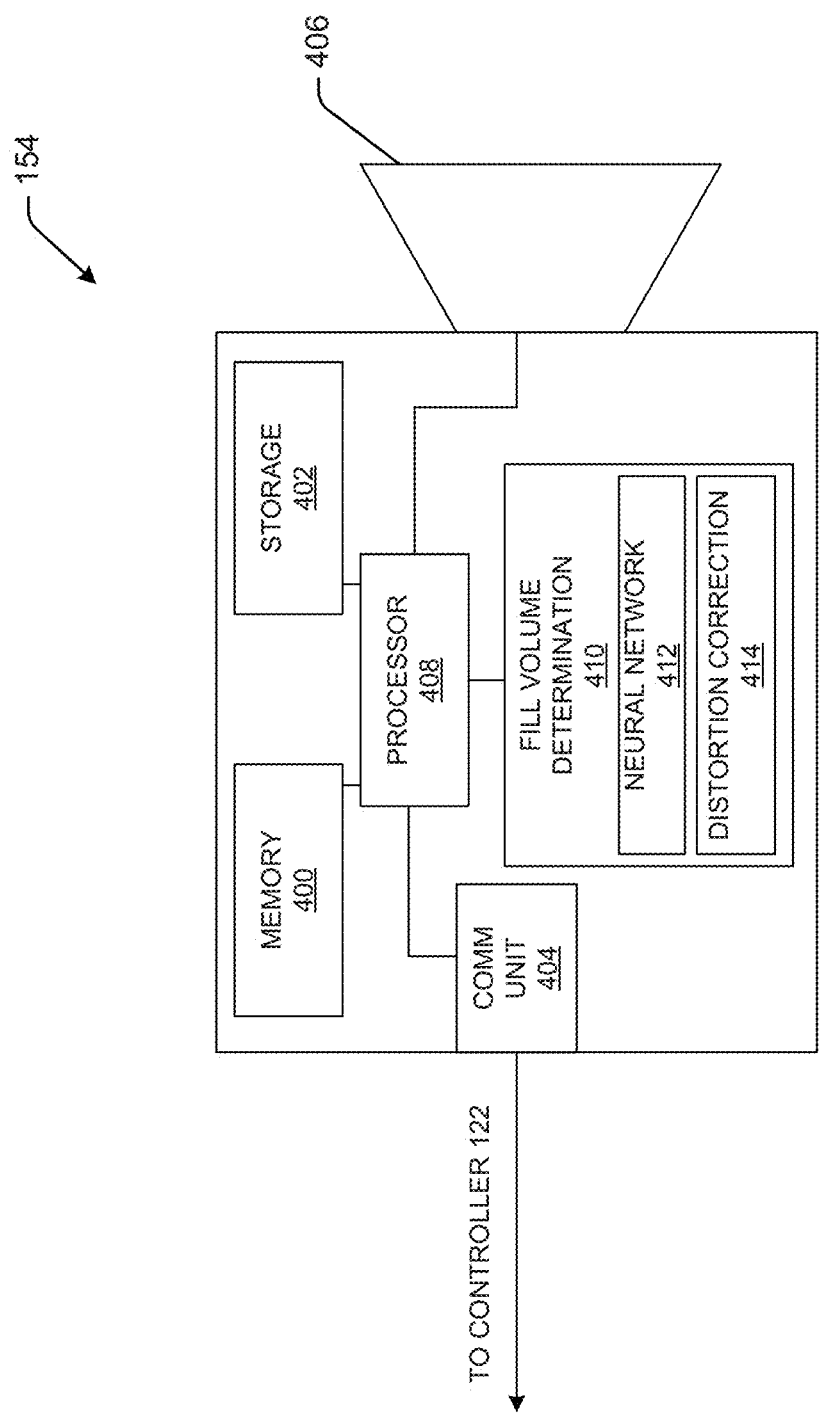
FIG. 4 is a schematic illustration of an exemplary camera associated with the control system of FIG. 3.

FIG. 4 shows an exemplary schematic representation of the camera 154. The camera 154 may have computing components for digital cameras. For example, the camera 154 may have memory 400, data storage 402, a communication unit 404, a lens unit 406, and a processor 408 configured to execute a payload optimization algorithm 410.

The memory 400 may include temporary data storage such as RAM. The data storage 402 may include persistent storage such as ROM, Flash, solid state, or other types of data storage known in the art.

The communication unit 404 may be configured to communicate with external components, such as the controller 122. The communication unit 404 may include, for example, USB, Firewire, Bluetooth, Wi-Fi, CAN bus, Ethernet or other electronic communication interfaces known in the art for interconnecting computing devices. Under the command of the processor 408, the communication unit 404 may intermittently or continually send data signals to the controller, including signals indicating whether the payload carrier 112 has been determined to be optimally loaded. In some embodiments, the communication unit 404 may also stream live image, e.g., video, data to the controller 122 for display or processing. For instance, the controller 122 may receive the image data and perform functionality associated with the fill volume determination component 410, e.g., to determine whether the payload carrier 112 is full.

Consistent with the disclosed embodiments, the lens unit 406 may comprise any two-dimensional lens system known in the art for digital cameras. For example, the lens unit 406 may embody a digital single-lens reflex (DSLR) system including a lens (e.g., 35 mm lens) and a two-dimensional image sensor, such as a CCD or CMOS image sensor. It is to be appreciated that the lens unit 406 may be the same type of lens unit used in conventional digital cameras or smartphones.

The lens unit 406 may output, e.g., to the processor 408, images in the form of a continuous or intermittent data stream containing color values for each pixel of the two-dimensional image sensor (e.g., a color filter array). Thus, the data stream may contain two-dimensional image information. The camera 154 may be positioned such that the lens unit 406 views the interior of the payload carrier 112 without obstruction, and thus and the output data stream may contain two-dimensional image information for the interior of the payload carrier 112.

The processor 408 may include an image processor known in the art for digital cameras. For example, the processor 408 may be a digital signal processor (DSP) configured to perform various types of imaging processing, such as Bayer transformation, demosaicing, noise reduction, imaging sharpening, edge-detection, and/or coordinate system transformation.

The fill volume determination component 410 may include computer program instructions installed on the processor 408 and/or stored in the memory 400 or the storage 402 for execution by processor 408. The fill volume determination component 410, executed by the processor 408, may be configured to process the two-dimensional digital image data received from the lens unit 406 to determine when the payload carrier 112 is optimally loaded. For example, the fill volume determination component 410 may segment the two-dimensional image data received from the lens unit 406 into a number of discrete sections and determine whether such segments of the image data include a depiction of fill or no fill. For instance, the fill volume determination component 410 can include a neural network 412 trained to determine whether an image includes a depiction of fill or no fill. Also in examples, the fill volume determination component 410 can include a distortion correction component 414 configured to perform distortion correction on images, e.g., to correct for lens distortion or the like.

Although the example of FIG. 4 shows the fill volume determination component 410 as part of the camera 154 and examples described herein discuss the fill volume determination component 410 as being part of the camera 154, this disclosure is not limited to these examples. For instance, the fill volume determination component 410 can be include and/or executed other than on the camera 154. In some examples, and without limitation, some or all of the functionality of the fill volume determination 410, the neural network 412, and/or the distortion correction component 414 can be included in the controller 122. In still further examples, functionality associated with the fill volume determination component can be performed other than on the machine 100, e.g., using a remote computing device in communication with one or more components of the machine, e.g., to receive image data generated by the camera 154 and/or provide information about the fill volume of the payload carrier 112, e.g., to an operator or one or more components of the machine 100 as described herein. In at least one example, the neural network can be stored at a remote location for access by more than one machine.

Figure 5:
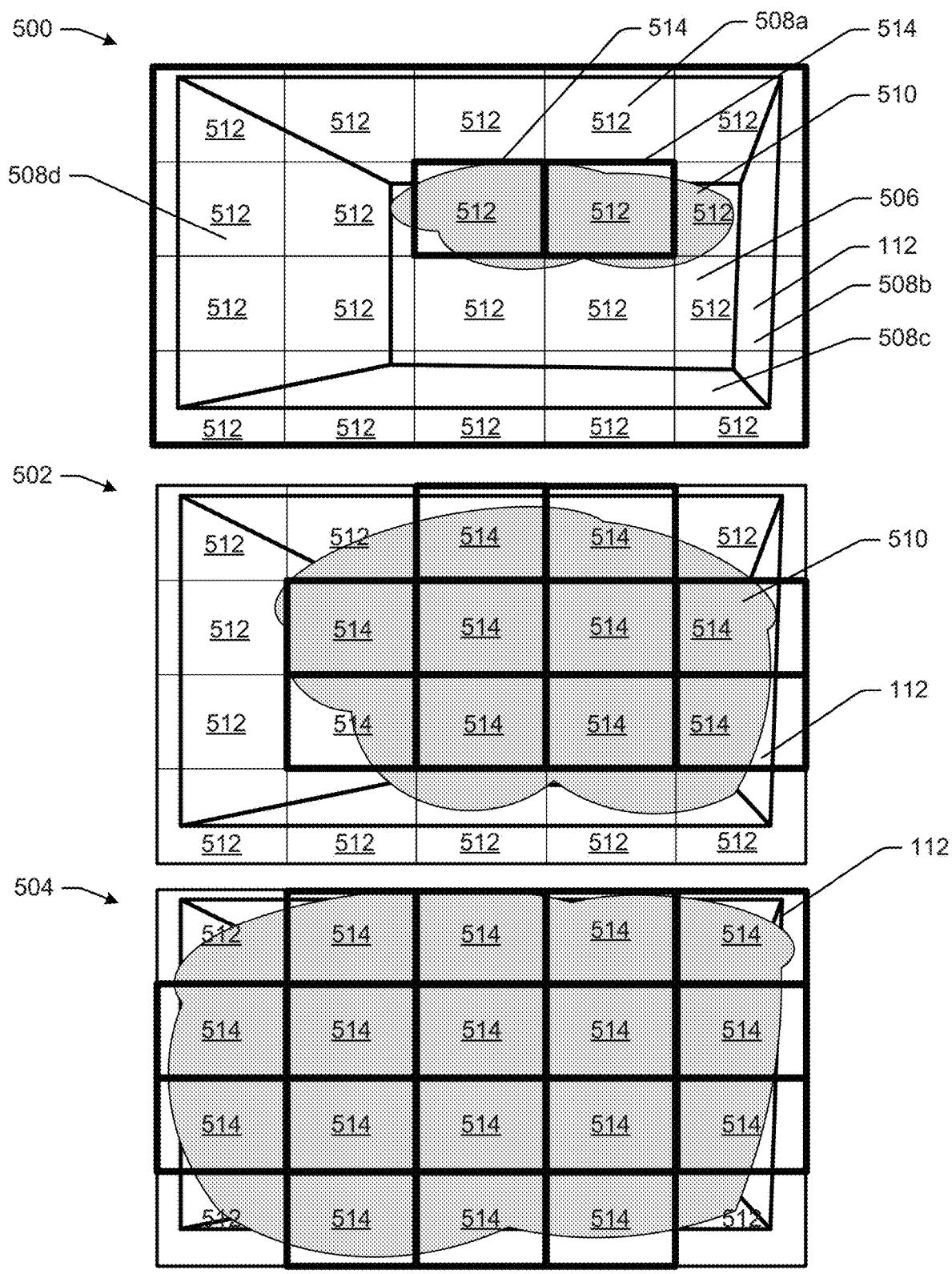
FIG. 5 and is a representation of images captured by the camera of FIG. 4.

FIG. 5 shows an example of the functionality of the fill volume determination component 410. More specifically, FIG. 5 shows a first image 500 captured at a first time, a second image 502 captured at a second time after the first time, and a third image 504 captured at a third time after the second time (collectively, "the images 500, 502, 504"). The images 500, 502, 504 will be used to illustrate how the fill volume determination component 410 may process the two-dimensional image data from lens unit 406. It will be appreciated that camera 154 may need to be placed so that it does not interfere with operations of the machine 100 yet still has a view of the interior of the payload carrier 112. For example, the payload carrier 112 may have a generally rectangular bottom 506 with generally vertical sides 508a, 508b, 508c, 508d and the camera 154 may be disposed on a mast or other mount proximate a corner of the payload carrier 112. Thus, the camera 154 may have a view from diagonally across and above the payload carrier 112. In the example of FIG. 5, the images 500, 502, 504 may be captured by the camera 154 positioned generally above the bottom, right corner (as oriented on the page) of the payload carrier 112. Such a position may be opposite (relative to the payload carrier 112) of the position depicted in FIG. 1. For purposes of clarity and simplicity, the images 500, 502, 504 depict the payload carrier 112 and fill disposed on the payload carrier 112. However, in practice, the apron 134, the ground-engaging tool 126, the load assist actuator 152, and/or other components may also be visible in the images 500, 502, 504. For instance, the apron 134 and the ground-engaging tool 126 may be located proximate the junction between the bottom 506 and the side 508a of the payload carrier 112. Techniques of this disclosure may be applicable to images captured from any camera position and/or of any payload carrier, regardless of shape or construction.

As illustrated in the first image 500, loading of the payload carrier 112 has just begun, so payload carrier 112 may contain only a relatively small, first amount of fill 510. The fill 510 may enter the payload carrier 112 via an opening between the bottom 506 and the side 508a, e.g., created by actuating the apron 134 (not shown in FIG. 5) away from the payload carrier 112. As also illustrated, the image 500 is partitioned or sectioned into a plurality of image sections 512. In the illustration, the image sections 512 are equally-sized and of the same shape, and are formed in an array over the entire image 502. Although 20 rectangular image sections 512 are illustrated in the examples of FIG. 5, more or fewer sections and/or differently-shaped sections may be used. In some examples, more, smaller sections may provide the fill volume with greater accuracy, as described herein. In some implementations, the size and shape of the sections 512 may be based on a resolution and/or other factors associated with the camera 154

In implementations of this disclosure, the fill volume determination component 410 may be configured to determine, for each of the image sections 512, whether a respective image section 512 depicts the fill 510 or does not depict fill. Thus, in the image 500, the fill volume determination component 410 may identify two of the image sections 512 as filled sections 514. For example, the fill volume determination component 410 may pass image data associated with each of the image sections 512 into the neural network 412. As noted above, the neural network 412 may be trained, e.g., on images of fill and no fill as described further herein, and may return an indication that the image section 512 includes fill or does not include fill. Thus, in the example of the image 500, only two of the sections 512 are determined to include the fill 510.

The second image 502 depicts the payload carrier 112 at a later time (e.g., relative to a time associated with the first image 500). In the second image 502, the payload carrier 112 has been filled further. More specifically, in the second image 502 ten of the image sections 512 are indicated as the filled sections 514. Similarly, the third image 504 depicts the payload carrier 112 at a still later time (e.g., relative to times associated with the first image 500 and the second image 502). In the third image 504, the payload carrier 112 has been filled further. More specifically, in the third image 504 seventeen of the image sections 512 are indicated as the filled sections 514.

In some examples, a number of filled segments may be indicative of an overall volume of the payload carrier 112. Thus, for example, the image 500, which shows two filled sections 514 and eighteen image sections 512 that do not include the fill 510 may correspond to the payload carrier 112 being 10% full. Similarly, the second image 502, which shows ten filled sections 514 and ten image sections 512 that are not filled, may correspond to the payload carrier 112 being about 50% filled. Finally, in the third image 504, there are seventeen filled sections 514 and three image sections 512 that are not indicated as filled. Accordingly, the image 504 may correspond to the payload carrier 112 being about 85% filled.

In other examples, the fill volume may not correspond directly to the number of filled sections 514. For instance, the first image 500 may correspond to the payload carrier 112 being less than 10% filled, e.g., because the image may be taken just as fill starts to enter the payload carrier 122, but the filled sections 514 may correspond to image sections that depict, at least in part, ground engaged by the ground-engaging tool 126 at or near commencement of the filling operation. In some instances, it may be expected that the payload carrier 112 will fill according to a predetermined pattern, e.g., such that the image sections 512 will become filled sections 514 in a predetermined pattern over successive (e.g., consecutive) images. In these instances, an amount (e.g., percentage) of fill may be determined, e.g., empirically, to determine a percentage corresponding to each fill pattern. Also in examples, the third image 504 may correspond to the payload carrier 112 being optimally filled, which may correspond to a fill volume of 100%. In some examples of this description, "optimally filled" may refer to a payload volume corresponding to the desired optimum stop time 208 on the load growth curve 200, e.g., at which the steep portion 202 transitions to the less steep portion 204. Thus, for example, the third image 504 may correspond to a fill volume corresponding to 100%, regardless of the fact that fewer than all of the image sections 512 are filled sections 514.

In some examples, the optimum volume and corresponding desired optimum stop time 208 may be determined in different ways. For example, these values may be determined empirically through field testing of the machine 100.

Alternatively, an operator or other person knowledgeable about the performance characteristics of the machine 100 may select the optimum volume/stop time 208 based on experience. The optimum volume/stop time 208 may also be determined mathematically by selecting a point on the load growth curve 200 at which the slope of load growth curve 200 reaches a certain desired threshold (e.g., 30%).

In some examples, the number of filled sections 514 may correspond generally to the actual volume of material 510 in the payload carrier 112. For example, certain materials are known to rest at certain angles of repose. Thus, if some number and/or pattern of the image sections 512 are indicated as filled sections 514, the fill 510 may have a certain corresponding height. Likewise, as the number of the filled sections 514 expands by a known amount, it may be assumed that the height of material 510 also grows by a corresponding known amount. This may allow a relative volume of the material to be calculated based on the number of filled sections 514. As discussed above, the number of filled sections 514 may correspond directly to a fill volume, or some other relationship may be determined. Additionally, an actual value for the volume of the material may be computed from the relative volume based on the known dimensions of the payload carrier 112. Accordingly, in the disclosed embodiments, the number of filled sections 514 may be used as a substitute or surrogate for volume. Also in examples, because the images 500, 502, 504 are not captured from directly above the payload carrier, but instead at an angle, image sections 512 proximate the outside of the images 500, 502, 504, and especially those edges further from the camera, may be associated with higher portions of the payload carrier 112, e.g., relatively farther away from the bottom 306. Thus, the height may be determined from the number of filled sections 516, and using the height and dimensions of the payload carrier 112, the actual volume may be calculated.

As noted above, the image sections 512 may be passed through the neural network 412, which determines whether the image section 512 includes a representation of fill (and is thus a filled section 516) or does not include a representation of fill. In some examples, the neural network 412 may be trained on images, e.g., historical images, captured by the camera 154.

Figure 6:
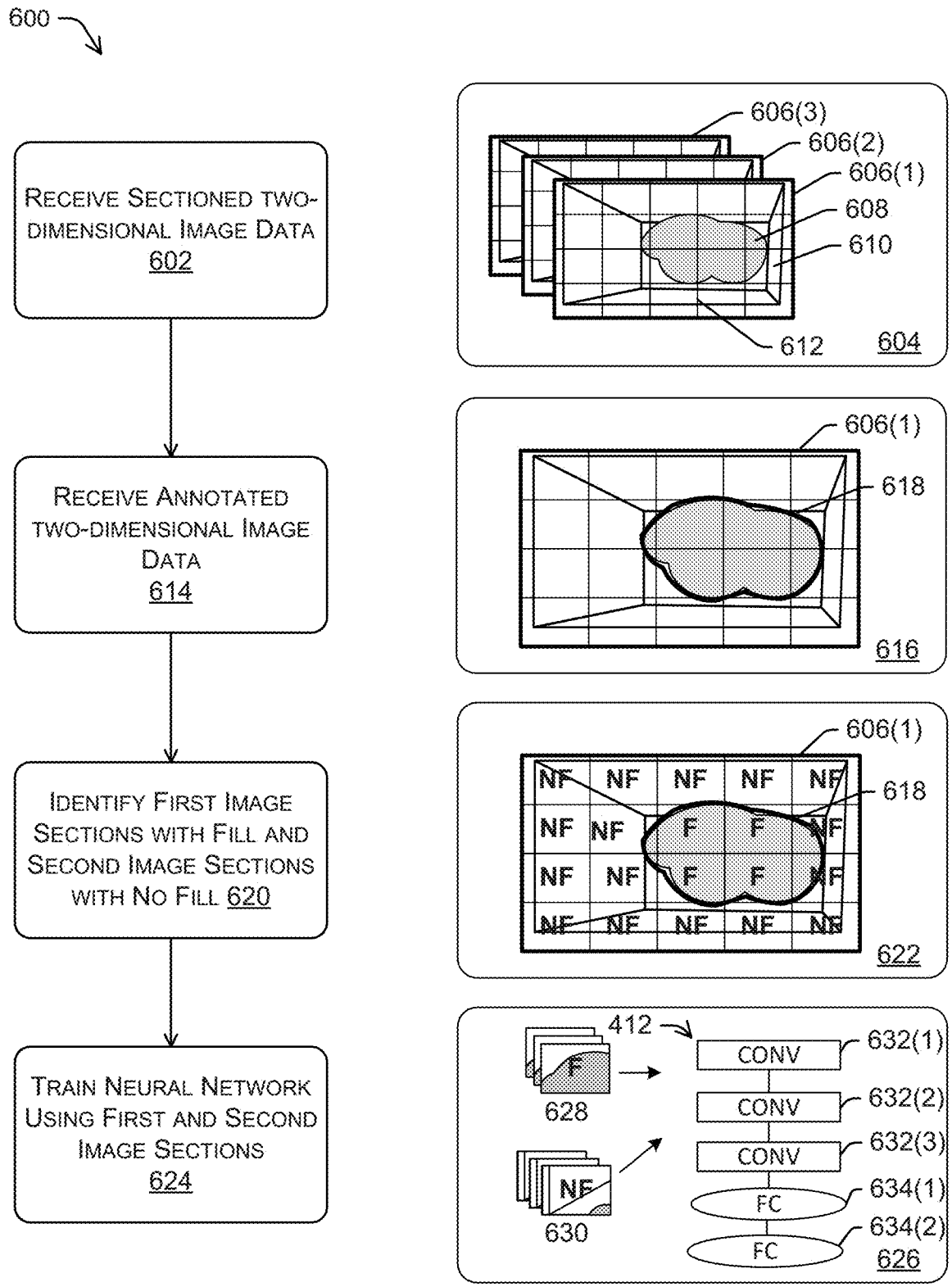
FIG. 6 includes textual and graphical flowcharts to illustrate a method of training a neural network according to techniques of this disclosure.

FIG. 6 is a pictorial flow diagram of an example process 600 for training a neural network, such as the neural network 412.

At operation 602, the process 600 can include receiving two-dimensional image data. For example, the image data may be a number of two-dimensional images captured by the camera 154. An example 604 accompanying the operation 602 depicts a plurality of two-dimensional images 606(1), 606(2), 606(3) (collectively, the images 606) including representations of fill 608 in a payload carrier 610. The images 606 also are depicted as being sectioned, e.g., by a grid 612. In examples, the payload carrier 610 in the images 606 can be the payload carrier 112, although images from other payload carriers, e.g., captured by a camera other than the camera 154 may be used for purposes of this disclosure. In fact, the images 606 can be images of different types of fill 608 in myriad different carriers. In some instances, techniques described herein may benefit from using images 606 of different types of fill 608 and different types of the payload carrier 610, e.g., such that the trained network can be used in a number of different applications. The grid 612 may partition the images 606 into any number of sections, which may be the same as or different from the number of sections 512 used in the image processing described above in connection with FIG. 5.

At operation 614, the process 600 can include receiving annotated two-dimensional image data. An example 616 accompanying the operation 614 illustrates the first image 606(1) and an annotation line 618 surrounding the fill 608. In some examples, the annotation line 618 may be manually generated, e.g., by a user viewing the image 606(1) on a computing device. In some examples, the user may use a pointing device to define the annotation line 618. In other examples, the annotation line 618 may be generated using image processing techniques, including but not limited to edge detection techniques.

At operation 620, the process 600 can include identifying first image sections with fill and second image sections with no fill. For example, the grid 612 may define a number of sections of the image 606(1) and the coordinates of the lines of the grid 612 and of the annotation line 618 may be used to determine whether individual of the sections contain fill. In some examples, if an overlap of the fill area, e.g., as defined by the annotation line 618, with a section defined by the grid 612 is equal to or less than a predetermine threshold (e.g., 50%), the image section may be a "no fill" image section. Conversely, if the overlap of the fill area, e.g., as defined by the annotation line 618, with a section defined by the grid 612 is equal to or greater than a predetermined threshold (e.g., 50%), the image section may be a "fill" image section. Thus, whether a section contains fill or does not contain fill may be relative, rather than absolute. Stated differently, a section may be considered a "no fill" section despite containing some fill and a section may be considered a "fill" section despite not all of the section including a depiction of the fill 608. As will be appreciated, by adjusting the threshold for determining "fill" versus "non-fill," different outcomes may be achieved.

As just described, the operation 620 may provide a binary determination, e.g., fill or no fill. An example 622 accompanying the operation 620 indicates this binary determination by showing first sections of the grid 612 indicated as containing fill, e.g., with a label "F," and second sections of the grid 612 containing no fill, e.g., with a label "NF." The image 606(1) includes four filled sections and sixteen not filled sections. As will be appreciated, using the techniques of the operations 602, 614, and 620, a single image, such as the image 606(1), can provide 20 labelled images for training a neural network.

At operation 624, the process 600 can include training a neural network using the first and second image sections. For example, each of the first and second image sections can provide labelled images used to train the neural network 412. In an example 626 accompanying the operation 624, labelled "fill" images 628 and labelled "not fill" images 630 are provided to the neural network 412. In the example 626, the neural network 412 can be a deep learning model and is illustrated as including three convolutional layers 632(1), 632(2), 632(3) and two fully connected layers 634(1), 634(2). The structure of the neural network 412 is for example only. In other examples, the neural network 412 can include more or fewer layers and/or components.

As will be appreciated, once trained, the neural network 412 can receive image data and determine whether the image data is an image of fill or not fill. Thus, when the neural network 412 is trained on the labelled "fill" images 628 that include 50% or more fill in the area of the image and on the labelled "not fill" images 630 have less than 50%, the neural network 412 will identity sections in a new image, such as the images 500, 502, 504, as including fill (e.g., 50% or more fill) or as not including fill (e.g., less than 50% fill). As discussed above, each of the sections 512 is passed through the neural network 412 to determine the filled sections 514 from sections that do not include fill, as detailed above.

As noted, the neural network 412 can be trained to make a binary decision, e.g., fill or not-fill, based on an amount of fill detected in the image. In some implementations, the neural network 412 may also calculate a confidence score associated with its determination. In some examples, only the image sections 512 that are determined to have a confidence score above a certain threshold may be identified as containing fill. Thus, for example, image sections for which the neural network 412 is not confident may be identified as not fill, e.g., to avoid over estimating the amount of fill in the payload carrier 112 and prematurely stopping the fill process.

In examples, the techniques described herein have been benchmarked against fill volumes calculated using three-dimensional data, e.g., from a LiDAR sensor mounted above the payload carrier 112. In at least some examples, the root mean square error between the volume calculated using the LiDAR data and the volume calculated using the techniques described herein has been calculated and the average root man square error has been below 3 cubic yards. Accordingly, the techniques described herein are accurate, while using far less computing power and less expensive components. The techniques described herein also are improvements over other two-dimensional approaches. For instance, some two-dimensional approaches have used motion vectors to calculate changes in volume. However, such approaches may require multiple images or frames to calculate motion. Unlike those examples, the techniques described herein can calculate volume from a single image. Because each image is handled discretely, any error can be corrected in a next frame, rather than being carried through multiple calculations. Stated differently, the techniques described herein can reduce false positives that may affect other two-dimensional techniques.

As noted above, the fill volume determination component 410 may also include the distortion correction component 414. For instance, the distortion correction component 414 may include functionality to correct images from the camera 154, e.g., to produce undistorted images. In some examples, the images 500, 502, 504 may be undistorted images. For example, the distortion correction component 414 can use image distortion correction techniques and the specifications of the camera 154 to correct images. In some instances, before mounting the camera 154 to the machine 100, the camera 154 may be calibrated using an open-source "checkerboard" technique that outputs calibration parameters required to produce a rectangular checkerboard of a predetermined size from a distorted image. The distortion correction component 414 may be configured to apply the calibration parameters to a distorted image to provide an undistorted image.

For instance, in some embodiments, the camera 154 may have a fisheye lens or other wide-angle lens to capture the entire payload carrier 112 from a close position. Thus, the camera 154 may produce images that bulge outward from "barrel" distortion induced by a wide-angle lens. Moreover, although the images 500, 502, 504 generally depict only the interior of the carrier, in some implementations, the camera 154 may have a larger field of view, e.g., such that more of the surroundings also are captured by the camera 154. In these instances, image data captured by the camera 154 can be manipulated to provide the top-down view shown in the images 500, 502, 504. For example, the top-down view may be obtained by applying rotational and/or translation transforms to size and/or orient the image data to create the images 500, 502, 504. In some examples, the distortion correction component can include functionality to apply perspective transformations (e.g., an OpenCV algorithm) so the corners of the payload carrier 112 form a rectangle, thereby transforming image data to create the top-down perspective. These and other image processing techniques are described in U.S. patent application Ser. No. 16/245,829 filed Jan. 11, 2019 and entitled "Optimizing Loading of a Payload Carrier of a Machine." That application and its contents hereby are incorporated by reference in their entirety.

Figure 7:
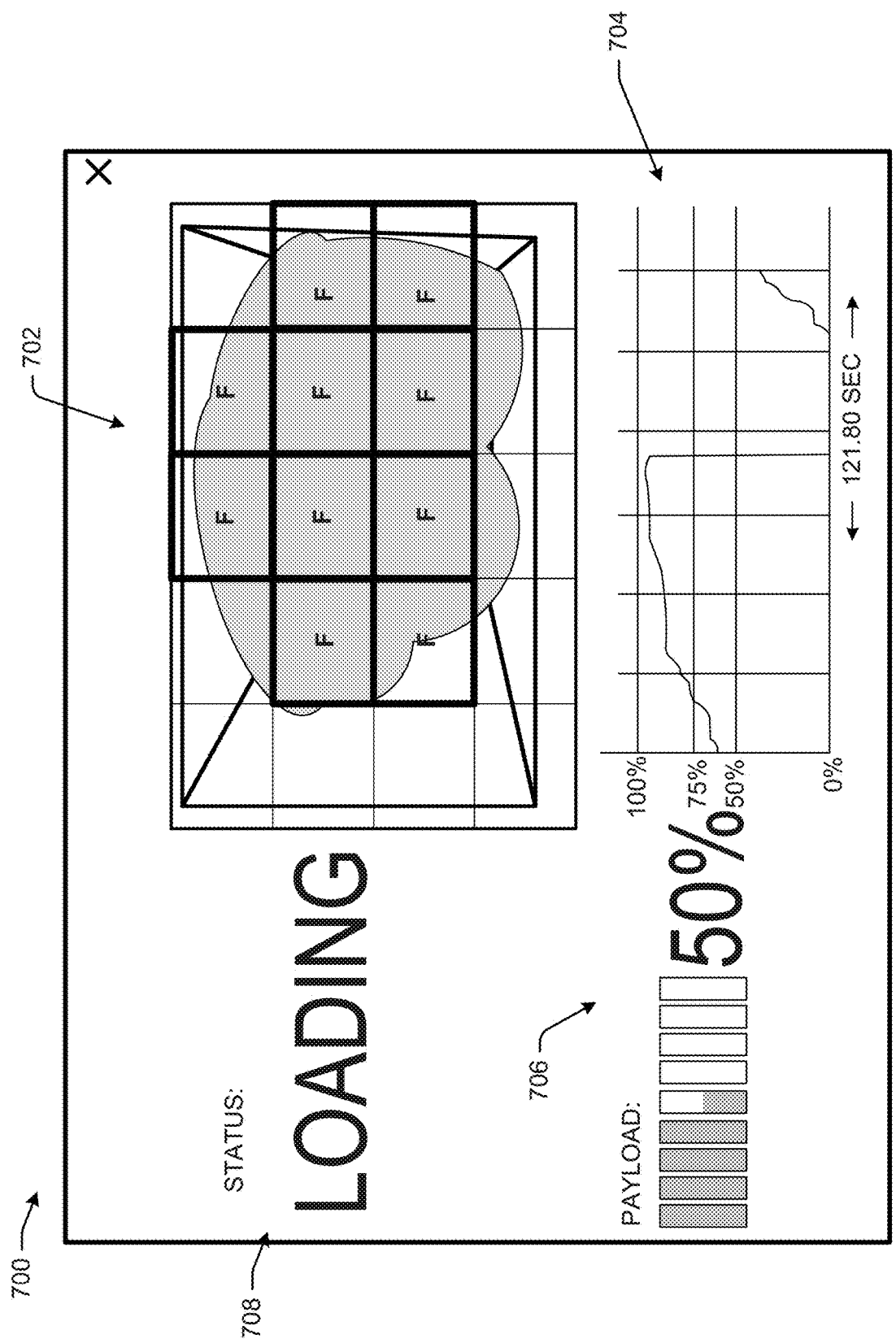
FIG. 7 is a representation of an exemplary interface displayed on a display device of the machine.

The fill volume determination component 410 may also send signals to the controller 122 to provide information to an operator of the machine 100 or some other user. For example, FIG. 7 illustrates a payload carrier status interface 700. The interface 700 may be displayed on the display device 120 for viewing by the operator. The interface 700 may have one or more user interface elements allowing the operator to provide or control information about the status of the payload carrier 112. For example, the interface 700 may include a video feed window 702 displaying a live video feed from camera 154, e.g., corresponding to the images 500, 502, 504. As also illustrated, the video feed window 702 may include an overlay showing the sections, e.g., the sections 512 associated with the images 500, 502, 504, and an indication of whether the sections are fill sections 514 or sections without fill. In this example, the video feed window can provide a type of occupancy map or grid indicating to the user which sections of the payload carrier 112 contain fill, e.g., according to the determination by the neural network 412.

The interface 700 may further include a payload growth curve 704 illustrating the current loading status of the payload carrier 112. Also in examples, the interface 700 may further have a fill factor indicator 706 indicating the percentage fill of the payload carrier 112, i.e., the percentage of the payload carrier 112 that is filled with the material 510. The interface 700 may also include a status identifier 708. In the example, the status identifier 708 is "loading," indicating that the payload carrier 112 is currently being filled. In some instances, the status identifier 708 may be updated to provide a notification that the payload carrier 112 is optimally filled, e.g., upon receiving a corresponding signal from the camera 154. For example, the interface 700 may be configured to display a "Stop Loading" message in the status identifier 708 upon receipt of such a signal. In such an example, the operator may know to stop the current loading phase. In other examples, as described herein, filling may be automatically stopped, e.g., by the autonomous control module 310 instructing the machine actuator module 306 to actuate the apron 132 to close the payload carrier 112.

Figure 8:
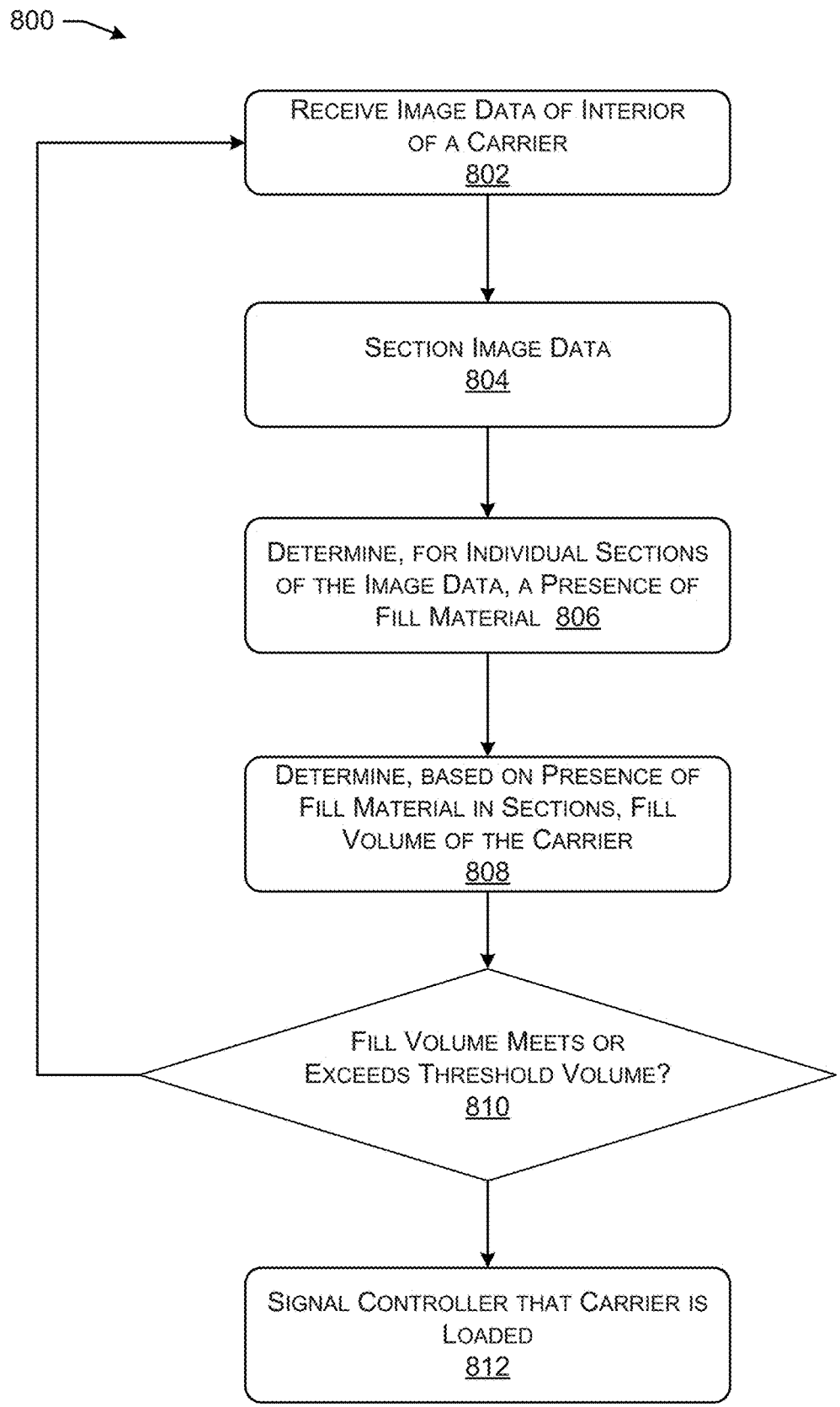
FIG. 8 is a flowchart of an exemplary method for optimizing loading of a carrier, such as a payload carrier.

FIG. 8 shows an exemplary method 800 for optimizing loading of a payload carrier, such as the payload carrier 112, during operation of a machine, such as the machine 100. The method 800 may be performed by the fill volume determination component 410, e.g., when executed by the processor 408, although other components may perform some or all of the operations of the process 800. The operations of the process 800 need not necessarily be performed in the order shown in FIG. 8 and may be performed in different orders consistent with the disclosed embodiments.

The process 800, as with portions of the process 600 described above, is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the process 800 can be combined in whole or in part with other methods.

At operation 802, the process 800 can include receiving image data of an interior of a carrier. For example, the fill volume determination component 410 may receive a live video feed that includes serial image frames, which may include the images 500, 502, 504 from the lens unit 406 depicting an interior of a carrier to be filled, such as the payload carrier 112. The video feed may be displayed in the window 702 of the interface 700. Optionally, in some examples, e.g., depending on the type of camera, the operation 802 may include distortion correction, e.g., performed by the distortion correction component 414.

At operation 804, the process 800 can include sectioning the image data. For example, the operation 802 may determine the sections 512, described above, as sections of the images 500, 502, 504. As noted above, the sections 512 may be formed as an array of similarly shaped and/or equally sized sections of an image frame. In some examples, each of the sections 512 may include an equal number of pixels of an image, such as the images 500, 502, 504. In other examples, the sections 512 may be differently shaped and/or differently sized. In the examples of FIG. 5, each image may be sectioned into 20 sections 512, although more or fewer sections may be used.

At operation 806, the process 800 can include determining, for individual sections of the image data, a presence of fill material. For example, as described herein, the neural network, 412 may be trained to determine whether an image (or an image segment) includes a representation of fill material. As described above in connection with FIG. 6, the neural network 412 may be trained to determine segments that contain a representation of fill and segments that do not contain a representation of fill. In some instances, as described herein, the neural network 412 will determine that an image section includes fill based on images indicating more than 50% fill material. In other implementations, different thresholds may be used.

At operation 808, the process 800 can including determining, based on a presence of fill material in the sections, a fill volume of the carrier. For example, and as detailed further herein, the number of image sections 512 indicated as containing fill may correlate to a volume of fill in a carrier, such as the payload carrier 112.

At operation 810, the process 800 can determine whether the fill volume meets or exceeds a threshold volume. For example, the fill volume determination component 410 may determine whether the fill factor determined at operation 808 is greater than or equal to a threshold percentage (e.g., 85%). As discussed above, the threshold percentage may be predetermined to correspond to a desired optimum loading volume of the payload carrier 112 relative to the total loading capacity.

If, at the operation 810, the process 800 determines that the fill volume does not meet or exceed the threshold volume, the process 800 may return to the operation 802, e.g., to analyze a new (later) image.

Alternatively, if, at the operation 810, the process 800 determines that the fill volume meets or exceeds the threshold volume, at operation 812 the process 800 can include signaling the controller that the carrier is loaded. For example, as discussed above, the processor 408 may transmit a signal via the communication unit 404 to the controller 122 indicating that the payload carrier 112 has been optimally loaded.

As explained above, the controller 122 may take one or more actions based on this notification, including any combination of, for example:

Provide signals to change a loading indicator light in the operator station 114 from green (continue loading) to red (stop loading) so the operator knows the payload carrier 112 is optimally filled. The operator may then manually control the machine 100 to stop loading the payload carrier 112.

Provide signal(s) to the display device 120 indicating that the payload carrier 112 is optimally filled. The display device 120 may, in turn, provide a visual indication on the display (e.g., a "Stop Loading" message), e.g., via the interface 700, letting the operator know that the payload carrier 112 is optimally filled. The operator may then manually control the machine 100 to stop loading payload carrier.

Provide signal(s) to the machine actuator module 306 indicating that the payload carrier 112 is optimally filled. The machine actuator module 306, in turn, may provide signals to actuate actuators to complete the loading phase. For example, the machine actuator module 306 may provide one or more signals to: (1) the lift actuator 124 to raise the payload carrier 112; (2) the apron actuator 132 to move the apron 134 from an open position to a closed position engaged with the front portion of the payload carrier 112; (3) the ejector actuator 128 to move the ejector 130 within the payload carrier 112, e.g., to dump the payload or stow the ejector 130 for the hauling phase; (4) the bail actuator 312 to manipulate a bail at the front 106 of the machine 100; (5) the steering actuator 136 to change the angle between the front 106 and the rear 110 sections of the machine 100; or (6) the load assist actuator 152 to stop and/or stow a load assist unit for the haul phase.

Provide signal(s) to the speed control module 308 indicating that the payload carrier 112 is optimally filled. In response to the signal(s), the speed control module 308 may be configured to bring the loading phase to an end by reducing the speed of the machine 100, stopping the machine 100, reducing the throttle or the speed of the power source(s) 104, 108, or the like.

Provide signal(s) to the autonomous control module 310 indicating that the payload carrier 112 is optimally filled. In response to the signal(s), the autonomous control module 310 may, for example, change the current operating mode of the machine 100 from the loading mode to the haul mode or perform other functions to complete the loading phase.

INDUSTRIAL APPLICABILITY

The disclosed embodiments may apply to work machines, such as, for example, wheel tractor scrapers, which may operate in cycles that may include load, haul, dump, and return phases. It is beneficial to complete these cycles as efficiently as possible by eliminating wasted time and resources such as person-hours and fuel. Efficiency may be increased by accounting for cycle characteristics—one of which is the load growth curve of the machine discussed herein.

Specifically, time and resources may be saved by accounting for the load growth curve 200 for the machine 100. By ensuring that, for each load cycle, operators do not continue loading the payload carrier 112 beyond the optimum volume, more cycles may be completed in less time and using less fuel.

The disclosed embodiments may provide a relatively inexpensive but effective technique to notify the operator to stop loading—or to autonomously control the machine 100 to do so once the optimum fill volume is reached. While payload volume can be determined with three-dimensional imaging systems such as LiDAR or stereo cameras, such systems are expensive. Thus, it may be cost-prohibitive to use three-dimensional payload imaging systems, for example, on a fleet of machines.

By contrast, the disclosed embodiments may instead apply an inexpensive two-dimensional camera 154, such as the types used on conventional, mass-produced smartphones or digital cameras. Volume may not be directly calculated from a two-dimensional image, but the disclosed embodiments may use the trained neural network 412 to determine a fill volume based on identifying the sections 512 of images 500, 502, 504 that are filled sections 514 and those sections 512 that do not include fill. Such section-by-section analysis can provide a surrogate for indirectly determining when the optimum payload volume has been reached. This advantageously allows the use of relatively inexpensive two-dimensional cameras instead of more expensive three-dimensional cameras. Additionally, two-dimensional image processing typically may require fewer computing resources than three-dimensional image processing. Thus, the disclosed embodiments may reduce cost by requiring fewer computing resources.

Additionally, the disclosed embodiments may enable the operator to better focus on safely driving the machine. By providing a notification (e.g., indicator light or indication on the display) when the payload carrier is optimally filled, the operator may not need to turn around to view the payload carrier to determine whether it is full, as in the case of conventional wheel tractor scrapers.

It will be apparent to those skilled in the art that various modifications and variations can be made to the disclosed payload overload control system without departing from the scope of the disclosure. Other embodiments will be apparent to those skilled in the art from consideration of the specification and practice of the embodiments disclosed herein. For example, this disclosure may describe embodiments in which camera 154 is "smart" and configured to perform operations associated with the fill volume determination component 410. This may allow the camera 154 to be offered as a standalone unit (e.g., kit) for retrofitting an older machine that does not otherwise have the disclosed payload fill determination functionality. However, machines may also be equipped with this functionality as a standard or optional feature. For example, this disclosure also includes using an ordinary camera instead of a "smart" camera. In such embodiments, one or more of the functions of camera 154, including one or more functions of fill volume determination component 410, may be associated with the controller 122 or some other portion of the machine 100, instead of the camera. In such examples, the camera 154 may need only capture the images of the payload carrier and provide them to the controller. In other examples, the camera 154 may perform distortion correction or other image processing before providing such images. Thus, it is intended that the specification and examples be considered as exemplary only, with a true scope of the disclosure being indicated by the following claims and equivalents thereof.

What is claimed is:

1. A method of determining a volume of fill material in a payload carrier of a machine, the method comprising:
   receiving, from a camera on the machine, a two-dimensional image of an interior of the payload carrier;
   identifying a plurality of regions of the two-dimensional image corresponding to regions of the interior of the payload carrier;
   determining, for individual regions of the plurality of regions, whether the individual regions include a representation of fill material; and
   determining a fill volume of the payload carrier based at least in part on a number of the individual regions that include the representation of fill material and at the exclusion of three-dimensional image data about the fill material.

2. The method of claim 1, wherein the determining the representation of the fill material comprises:
   for a first region of the plurality of regions, passing a portion of the two-dimensional image corresponding to the first region into a neural network, and
   receiving, from the neural network, an indication that the first region includes the representation of fill material.

3. The method of claim 2, wherein the neural network is configured to determine the indication that the first region includes the representation of fill material in response to determining a similarity of the portion of the two-dimensional image to reference images indicated as including fill in a predetermined area of the reference image.

4. The method of claim 1, wherein the plurality of two-dimensional regions comprises an array of similarly-shaped regions, adjacent of the similarly-shaped regions sharing a border.

5. The method of claim 1, further comprising:
   determining that the fill volume is equal to or greater than a threshold fill volume; and
   sending, based at least in part on determining that the fill volume is equal to or greater than the threshold fill volume, a signal to a controller associated with the machine.

6. The method of claim 5, wherein the determining that the fill volume is equal to or greater than the threshold fill volume comprises determining that a predetermined number of the plurality of two-dimensional regions includes a representation of fill material.

7. A machine comprising:
   a payload carrier defining an interior having a volume;
   a camera fixed relative to the interior of the payload carrier and configured to capture two-dimensional images of the interior of the payload carrier;
   a display device; and
   a controller configured to:
      receive an image of the two-dimensional images;
      determine, for individual regions of a plurality of regions of the image, whether the individual regions include a representation of fill material;
      determine, based at least in part on whether the individual regions include the representation of fill material, a fill volume of the payload carrier, the fill volume representative of a relationship of a number of individual regions including the representation of fill material and a total number of the plurality of regions; and cause the display device to display information about the fill volume.

8. The machine of claim 7, wherein the controller is further configured to:

determine that the fill volume is equal to or exceeds a threshold fill volume; and generate, based at least in part on determining that the fill volume is equal to or exceeds the threshold fill volume, a signal indicative of the payload carrier being loaded.

9. The machine of claim 8, wherein the controller is configured to determine that the fill volume is equal to or exceeds the threshold fill volume based at least in part on at least one of determining that a predetermined number of the plurality of regions includes the representation of the fill material or that a specific one of the plurality of regions includes the representation of the fill material.

10. The machine of claim 8, wherein the controller is further configured to cause the display device to indicate that the payload carrier is loaded at least in part in response to the signal.

11. The machine of claim 8, further comprising:

one or more actuators; and an actuator controller configured to receive the signal and, in response to the signal, control the one or more actuators to raise the payload carrier from a ground surface.

12. The machine of claim 7, wherein determining that the individual regions include the representation of the fill material comprises:

passing a portion of the two-dimensional image corresponding to the individual region into a neural network, and receiving, from the neural network, an indication that the individual region includes the representation of fill material and a certainty associated with the indication.

13. The machine of claim 12, wherein the neural network is configured to determine the indication that the individual region includes the representation of fill material in response to determining a similarity of the portion of the two-dimensional image to reference images indicated as including fill in a predetermined area of the reference image.

14. The machine of claim 7, wherein the plurality of regions comprises an array of similarly-shaped regions, adjacent of the similarly-shaped regions sharing a border.

15. The machine of claim 7, wherein the first fill volume is a ratio of the number to the total number.

16. A camera system for assisting loading of a payload carrier of a machine, the camera system comprising:

a two-dimensional camera;

one or more processors; and memory storing instructions that, when executed by the one or more processors, cause the camera system to perform actions comprising:

receiving, from the two-dimensional camera, an image of an interior of the payload carrier of the machine;

identifying a plurality of regions of the image;

determining, for individual regions of the plurality of regions, a presence of fill material; and determining, based at least in part on the presence of fill material in the individual regions, and at the exclusion of three-dimensional image data, a fill volume of the payload carrier.

17. The camera system of claim 16, wherein the determining presence of fill material comprises:

for a first region of the individual regions, passing a portion of the image corresponding to the first region into a neural network, and receiving, from the neural network, an indication that the first region includes the presence of fill material and a certainty associated with the indication.

18. The camera system of claim 17, wherein the neural network is configured to determine the indication that the first region includes the presence of fill material in response to determining a similarity of the portion of the image to reference images indicated as including fill in a predetermined area of the reference image.

19. The camera system of claim 16, the actions further comprising:

determining, based at least in part on the fill volume being equal to or exceeding a threshold fill volume, that the payload carrier is loaded; and generating a signal indicative of the payload carrier being loaded.

20. The camera system of claim 19, the actions further comprising:

sending the signal to at least one of a display device associated with the machine or an actuator controller associated with one or more actuators actuatable to stop filling of the payload carrier.

* * * * *